United States Patent
Sasaki (10) Patent No.: US 12,546,573 B2
(45) Date of Patent: Feb. 10, 2026

(54) GAS GENERATOR

(71) Applicant: Daicel Corporation, Osaka (JP)

(72) Inventor: Tomoya Sasaki, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 18/384,999

(22) Filed: Oct. 30, 2023

(65) Prior Publication Data
US 2024/0060753 A1 Feb. 22, 2024

Related U.S. Application Data

(63) Continuation of application No. PCT/JP2021/048794, filed on Dec. 28, 2021.

(30) Foreign Application Priority Data

Apr. 30, 2021 (JP) ................... 2021-077911

(51) Int. Cl.
*F42B 3/04* (2006.01)
*B60R 21/261* (2011.01)
(Continued)

(52) U.S. Cl.
CPC .............. *F42B 3/04* (2013.01); *B60R 21/261* (2013.01); *B60R 21/2644* (2013.01);
(Continued)

(58) Field of Classification Search
CPC ....... F42B 3/04; B60R 21/261; B60R 21/262; B60R 21/264; B60R 21/2644; B60R 21/26011; B60R 21/26
(Continued)

(56) References Cited

U.S. PATENT DOCUMENTS 5,269,561 A * 12/1993 Davis .................. F42B 3/04
280/736
5,826,904 A * 10/1998 Ellis .................. B60R 21/261
222/3
(Continued)

FOREIGN PATENT DOCUMENTS

DE 202005017267 U1 * 4/2006 ............ B60R 21/23
EP 0812740 A2 12/1997
(Continued)

OTHER PUBLICATIONS

Machine translation of DE 20 2005 017 U1 (Year: 2006).*
(Continued)

*Primary Examiner* — James S Bergin
(74) *Attorney, Agent, or Firm* — XSENSUS LLP (57) ABSTRACT

A gas generator includes a housing, an ignition device attached to one end side of the housing, a combustion chamber, a diffuser portion formed on the other end side and including a closed end, an open end, and a side wall positioned between the closed end and the open end, a plurality of gas discharge ports formed in the diffuser portion and including a first gas discharge port having a short distance from the combustion chamber and a second gas discharge port having a long distance from the combustion chamber, and a total opening area of the first gas discharge port and a total opening area of the second gas discharge port are different from each other, and a filter accommodated in the accommodating space, the filter extending from a side of the open end toward a side of the closed end in the diffuser portion.

16 Claims, 9 Drawing Sheets

(51) Int. Cl.
  *B60R 21/262* (2011.01)
  *B60R 21/264* (2006.01)
  *B60R 21/26* (2011.01)
(52) U.S. Cl.
  CPC ... *B60R 2021/26011* (2013.01); *B60R 21/262* (2013.01); *B60R 21/264* (2013.01)
(58) Field of Classification Search
  USPC .......................................................... 102/530
  See application file for complete search history.

(56) References Cited

U.S. PATENT DOCUMENTS

| | | | |
|---|---|---|---|
| 6,412,816 B1* | 7/2002 | Gast | B60R 21/2644 280/736 |
| 11,548,466 B2* | 1/2023 | Disam | B60R 21/2171 |
| 12,208,764 B2* | 1/2025 | Fischer | B60R 21/261 |
| 12,304,417 B2* | 5/2025 | Katsuda | B60R 21/262 |
| 12,330,579 B2* | 6/2025 | Fukumoto | B60R 21/239 |
| 2004/0201208 A1* | 10/2004 | Longhurst | B60R 21/2644 280/741 |
| 2004/0232664 A1* | 11/2004 | Tokunaga | B60R 21/26 280/730.2 |
| 2008/0131631 A1* | 6/2008 | Huber | B60R 21/26 428/34.1 |
| 2008/0143088 A1* | 6/2008 | Yamazaki | B60R 21/2644 280/739 |
| 2012/0042801 A1* | 2/2012 | Sasamoto | C06D 5/06 102/530 |
| 2022/0001826 A1 | 1/2022 | Disam et al. | |
| 2023/0146277 A1 | 5/2023 | Disam et al. | |
| 2024/0317172 A1* | 9/2024 | Katsuda | B60R 21/26 |
| 2025/0076008 A1* | 3/2025 | Yonezawa | B60R 21/2644 |

FOREIGN PATENT DOCUMENTS

| | | | |
|---|---|---|---|
| JP | 3044475 U | 12/1997 | |
| JP | 2002-539007 A | 11/2002 | |
| JP | 2003-034221 A | 2/2003 | |
| JP | 2010-260387 A | 11/2010 | |
| JP | 2016-022929 A | 2/2016 | |
| WO | 2003010033 A2 | 2/2003 | |
| WO | 2020069823 A1 | 4/2020 | |
| WO | WO-2022230242 A1 * | 11/2022 | F42B 3/04 |

OTHER PUBLICATIONS

International Search Report issued Nov. 3, 2022 in corresponding International Patent Application No. PCT/JP2021/048794, 7 pages.
Written Opinion of the International Searching Authority issued Nov. 3, 2022 in corresponding International Patent Application No. PCT/JP2021/048794, 5 pages.
English translation of the Written Opinion of the International Searching Authority issued Oct. 31, 2023 in corresponding International Patent Application No. PCT/JP2021/048794, pages.
Supplementary European Search Report mailed Feb. 24, 2025, in European Application No. 21939396.4, 9 pages.

* cited by examiner

GAS GENERATOR

TECHNICAL FIELD

The present disclosure relates to a gas generator.

BACKGROUND ART

There has been proposed a known gas generator including a sectioning member and a partition wall part which section a space in a housing into a combustion chamber, a gas passage chamber and a filter chamber (e.g., Patent Document 1).

CITATION LIST

Patent Documents

Patent Document 1: JP No. 2016-22929

SUMMARY OF INVENTION

Technical Problem

In the gas generator, a filter is disposed facing the plurality of gas discharge ports, and when combustion gas introduced from one end of the filter is discharged from the plurality of gas discharge ports having different distances from the one end, the combustion gas discharged from each of the gas discharge ports has a different temperature according to the distance by which the combustion gas passes through the filter.

It is an object of the technique of the present disclosure to provide a technique for controlling the temperature of combustion gas to be discharged in a gas generator including a cooling filter.

Solution to Problem

A gas generator of one embodiment of the present disclosure includes: a housing forming an outer shell container; an ignition device attached to one end side of the housing; a combustion chamber formed inside the housing and configured to accommodate a gas generating agent; a diffuser portion in a cup shape formed on the other end side in the housing, the diffuser portion including a closed end formed in one end part, an open end formed on an opposite side of the closed end, and a side wall positioned between the closed end and the open end, the diffuser portion in which the open end is disposed to face the combustion chamber and an accommodating space for internally accommodating a filter is formed, the diffuser portion including a plurality of gas discharge ports; and a filter including at least a part accommodated in the accommodating space and facing the plurality of gas discharge ports, the filter including a solid cooling portion that extends from a side of the open end toward a side of the closed end in the diffuser portion and cools a combustion gas of the gas generating agent. The plurality of gas discharge ports include one or a plurality of first gas discharge ports relatively close in distance from the combustion chamber and one or a plurality of second gas discharge ports relatively farther in distance from the combustion chamber than the one or the plurality of first gas discharge ports, and a total opening area of the one or plurality of first gas discharge ports is different from a total opening area of the one or plurality of second gas discharge ports.

When the gas generator has a plurality of gas discharge ports, the amount of combustion gas discharged from each of the gas discharge ports per unit time varies depending on the area of the gas discharge port. In the above-described gas generator, the distance by which the combustion gas passes through the cooling portion of the filter varies depending on the distance from the combustion chamber to the gas discharge port, and accordingly, the temperature of the combustion gas discharged from each of the gas discharge ports also varies. Therefore, by making the total opening area of the first gas discharge ports and the total opening area of the second gas discharge ports different from each other, it becomes possible to change the ratio of the amount of the combustion gas discharged from both the first gas discharge ports and the second gas discharge ports and to control the temperature of the combustion gas in which these gases are mixed.

The one or plurality of first gas discharge ports and the one or plurality of second gas discharge ports may be provided in the side wall of the diffuser portion, and the filter may be disposed without a gap between the filter and the side wall of the diffuser portion. Such a filter has a larger volume and can enhance the cooling effect of the combustion gas.

The one or plurality of first gas discharge ports and the one or plurality of second gas discharge ports may be provided in the side wall of the diffuser portion, the filter may have a taper that decreases in diameter from the side of the open end toward the side of the closed end in the diffuser portion, and an annular gap may be provided between the filter and the side wall of the diffuser portion. By doing this, the flow of the combustion gas is not concentrated on a part of the filter facing the gas discharge port, and the load on the part can be reduced.

The total opening area of the one or plurality of second gas discharge ports may be larger than the total opening area of the one or plurality of first gas discharge ports. The combustion gas discharged from the second gas discharge ports whose distance from the combustion chamber is relatively longer than that of the first gas discharge ports is relatively longer in distance by which the combustion gas passes through the filter than the combustion gas discharged from the first gas discharge ports. By increasing the total opening area of the second gas discharge ports, it is possible to use a larger part of the filter as a cooling portion, and to lower the temperature of the combustion gas to be discharged.

The one or plurality of first gas discharge ports and the plurality of second gas discharge ports may each have the same diameter, and the plurality of second gas discharge ports may be larger in number than the one or plurality of first gas discharge ports. The one or plurality of first gas discharge ports may be the same in number as the one or plurality of second gas discharge ports, and the opening area of each of the one or plurality of second gas discharge ports may be larger than the opening area of each of the one or plurality of first gas discharge ports. Such a configuration can make the total opening area of the second gas discharge ports larger than the total opening area of the first gas discharge ports.

The filter may protrude from the open end in the diffuser portion toward the combustion chamber formed inside the housing, and have an annular gap between the filter and the housing. By doing this, the combustion gas flows into the filter not only from the end part of the filter in the protruding direction to the combustion chamber but also from the gap formed between the filter and the housing. In this manner, by widely dispersing the inflow place, it is possible to efficiently use, as the cooling portion, a wider region of the filter.

The filter may be formed of a metal wire material or perforated plate. With such a material, it is possible to form the cooling portion that cools the combustion gas.

The filter may have a through hole extending from the side of the open end toward the side of the closed end in the diffuser portion. The filter may have such a through hole in addition to the cooling portion.

Advantageous Effects of Invention

According to some embodiments of the present disclosure, it is possible to provide a technique for controlling the temperature of combustion gas to be discharged in a gas generator including a cooling filter.

BRIEF DESCRIPTION OF DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

DESCRIPTION OF EMBODIMENTS

Embodiments according to the present disclosure will be described below with reference to the accompanying drawings. It should be noted that the respective configurations and the combinations thereof in the respective embodiments are mere examples, and the configurations can be added, omitted, substituted, and differently modified as appropriate within a scope not departing from the spirit of the present invention. The present disclosure is not limited by the embodiment and is limited only by the claims.

First Embodiment

Figure 1:
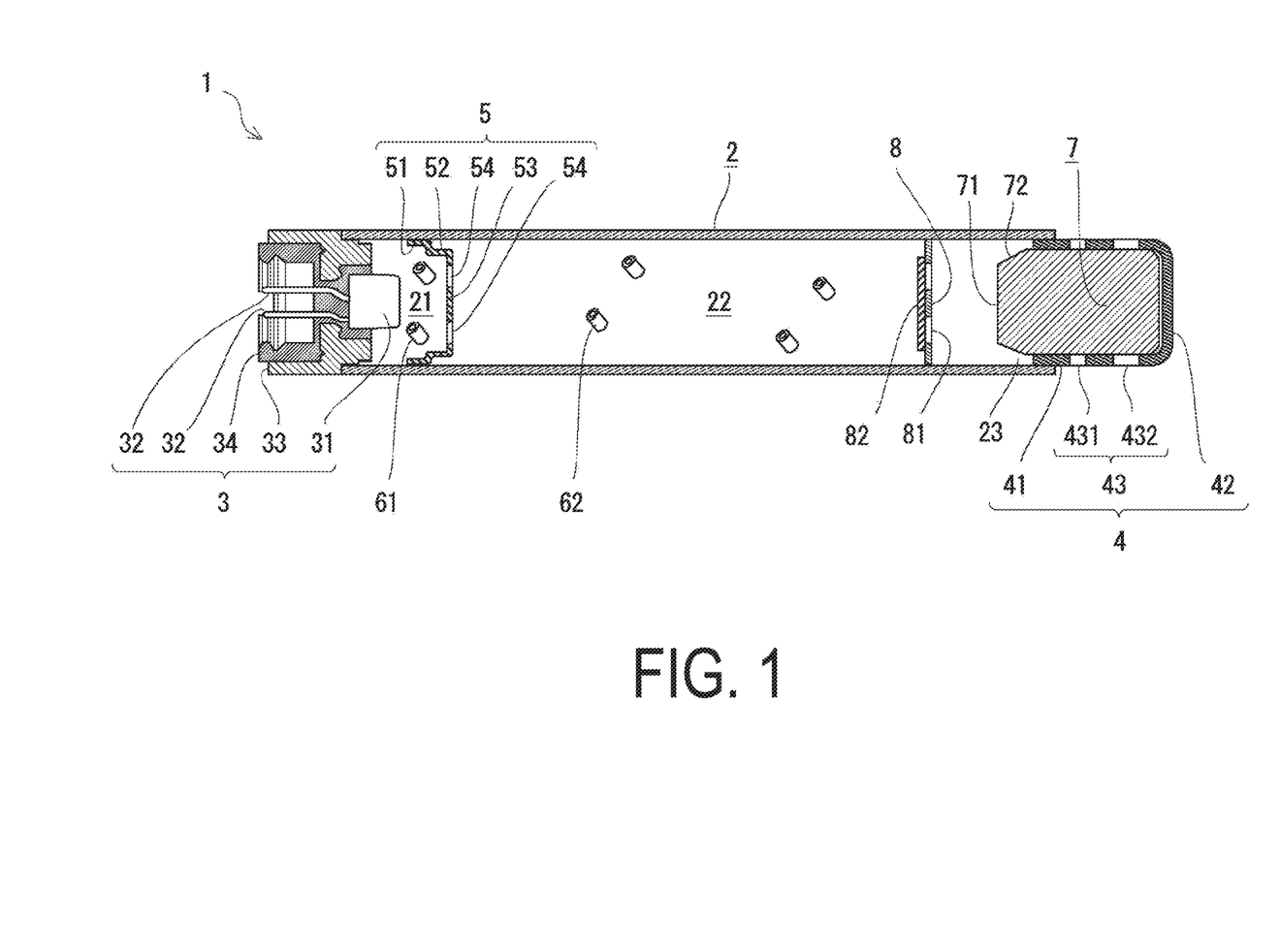
FIG. 1 is a schematic axial cross-sectional view illustrating an example of a gas generator according to a first embodiment.

FIG. 1 is a schematic axial cross-sectional view illustrating an example of the gas generator according to one embodiment of the present disclosure. A gas generator 1 can be used as a gas generation device for inflating an airbag, for example. The gas generator 1 of FIG. 1 includes a tubular housing 2, an ignition device 3 attached to one axial end side of the housing 2, and a diffuser portion 4 formed on the other end side of the housing 2.

The ignition device 3 is a device that ignites with an ignition current, and is the same as one used in a known gas generator. For example, the ignition device 3 has a metal cup body 31 that accommodates and seals an ignition charge, and a pair of conductive pins 32 and 32 for receiving supply of a current from the outside, and these are fixed to a metal igniter holding portion 33 with a resin member 34. The igniter holding portion 33 of the ignition device 3 is attached to an opening on one axial end side of the housing 2 by, for example, full circumference welding.

The housing 2 is, for example, a tubular member having a substantially uniform inner diameter and outer diameter, and forms an outer shell container of the gas generator 1. The material of the housing 2 is, for example, metal. A partition wall 5 in a cup shape is disposed inside the housing 2 at a predetermined distance away from the ignition device 3.

In other words, the partition wall 5 is a bottomed tubular member with the side part including a large diameter part 51 having a large diameter and a small diameter part 52 having a small diameter. The outer diameter of the large diameter part 51 of the partition wall 5 is substantially the same as the inner diameter of the housing 2. Therefore, the housing 2 can accommodate the partition wall 5 and thus a bottom part 53 is positioned on the diffuser portion 4 side. The housing 2 and the outer periphery of the large diameter part 51 may be welded, or may be connected by engagement portions (not illustrated) such as recesses and protrusions that are engaged with each other and provided on the inner periphery of the housing 2 and the outer periphery of the large diameter part 51. At least one through hole 54 having a predetermined shape is formed in the bottom part 53 of the partition wall 5. The through hole 54 allows a combustion product of a gas generating agent described later to pass therethrough. A through hole may also be provided in a side part in the small diameter part 52 of the partition wall 5. The partition wall 5 partitions an internal space of the housing 2 into a first combustion chamber 21 (also called an "enhancer chamber") formed between the ignition device 3 and the partition wall and a second combustion chamber 22 formed between the partition wall 5 and the diffuser portion. The side part (the large diameter part 51 or the small diameter part 52) of the partition wall 5 may be extended to such an extent that the partition wall 5 and the ignition device 3 come into contact with each other, and the first combustion chamber 21 may be formed by the partition wall 5 and the ignition device 3.

The first combustion chamber 21 accommodates a first gas generating agent 61 (also called "transfer charge" or "enhancer agent"). The second combustion chamber 22 accommodates a second gas generating agent 62. The gas generating agent (the first gas generating agent 61 and the second gas generating agent 62) is formed of, for example, guanidine nitrate (41 wt. %), basic copper nitrate (49 wt. %), a binder, and additives. As an individual shape of the gas generating agent, a single-hole columnar shape can be used. However, the gas generating agent is not limited to those described above. The first gas generating agent 61 and the second gas generating agent 62 may be gas generating agents of the same type, the same shape, and the same dimensions, or may be gas generating agents of different types, different shapes, and different dimensions.

The diffuser portion 4 is a cup-shaped member that is attached and thus closes the other end side of the housing 2, and accommodates a filter 7 therein. In other words, the diffuser portion 4 has a bottomed tubular shape, and is disposed and thus its open end faces the second combustion chamber 22. That is, the diffuser portion 4 has a side wall 41 and a closed end 42, and the open end side of the side wall 41 opposite to the closed end 42 is connected to the housing 2. In the example of FIG. 1, the outer diameter of the side wall 41 is substantially the same as the inner diameter of the housing 2, and a part of the side wall 41 on the open end side is accommodated in the housing 2. The open end side of the side wall 41 may be fixed to the housing 2 by crimping, or the diffuser portion 4 and the housing 2 may be welded. The diffuser portion 4 may be formed integrally with the housing 2 by, for example, drawing or the like.

Figure 10:
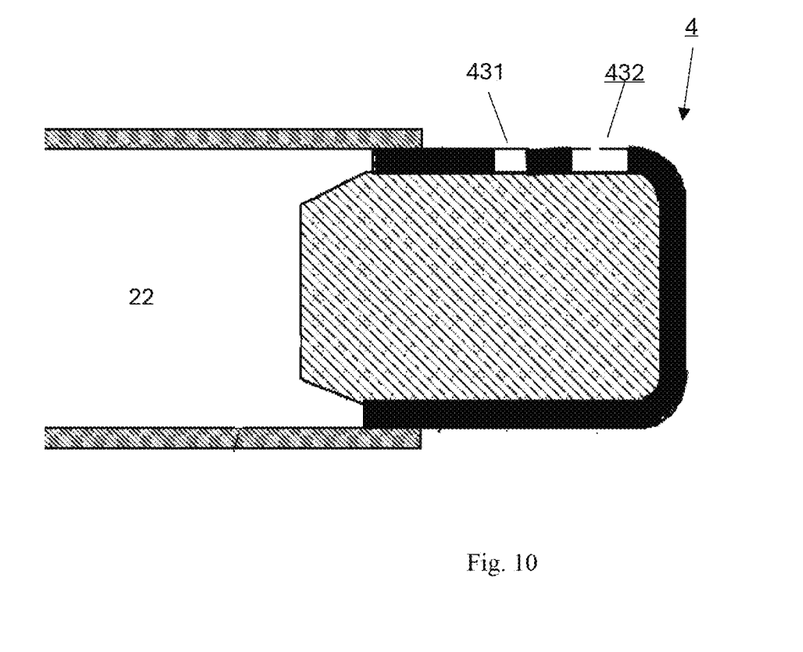
FIG. 10 is a partial schematic axial cross-sectional view illustrating an example of a gas generator according to one embodiment.

As illustrated in FIG. 1 and FIG. 10, at least one gas discharge port 43 is formed on the side wall 41 of the diffuser portion 4. The gas discharge port 43 includes a first gas discharge port 431 (also called "first gas discharge port group") and a second gas discharge port 432 (also called "second gas discharge port group"). The second gas discharge port 432 may be provided not on the side wall 41 but at the closed end 42. In the example of FIG. 1, the individual opening area of the second gas discharge ports 432 is larger than that of the first gas discharge ports 431. The number of the first gas discharge ports 431 and the number of the second gas discharge ports 432 are each 1 or more. In the present embodiment, a plurality of the first gas discharge ports 431 and a plurality of the second gas discharge ports 432 are formed at equal intervals in the circumferential direction of the diffuser portion 4, and the numbers of the both are equal to each other. Therefore, in the present embodiment, the total opening area of the second gas discharge ports 432 is larger than the total opening area of the first gas discharge ports 431. Here, the "total opening area" refers to each of the sums of the opening areas of the one or plurality of gas discharge ports 43 (i.e., the sum of the total of the opening areas of the gas discharge ports included in the first gas discharge port group and the total of the opening areas of the gas discharge ports included in the second gas discharge port group). The first gas discharge port 431 and the second gas discharge port 432 are provided at positions at different distances from the second combustion chamber 22. In the example of FIG. 1, the second gas discharge port 432 is farther from the second combustion chamber 22 than the first gas discharge port 431.

An accommodating space for accommodating the filter 7 is formed inside the cup-shaped diffuser portion 4. At least a part of the filter 7 is accommodated in the accommodating space of the diffuser portion 4. When the combustion gas generated by the gas generating agents 61 and 62 passes through the filter 7, the filter 7 functions as a cooling portion that cools the combustion gas, and filters the combustion gas by filtering combustion residues of the combustion gas.

The filter 7 has a columnar shape and extends from the side of the open end toward the closed end 42 side of the diffuser portion 4, and the side of the open end protrudes into the second combustion chamber 22. The surface of the filter 7 is accommodated and thus faces the gas discharge port 43 of the diffuser portion 4. When the closed end 42 of the diffuser portion 4 is provided with the gas discharge port 43, the end surface of the filter 7 on the closed end 42 side faces the gas discharge port 43. The side surface of the filter 7 is in contact with the inner periphery of the side wall 41 of the diffuser portion 4 and thus the combustion gas passes through the filter 7.

For example, the filter 7 may be one in which a plain-knitted metal wire material is accommodated in a molding die and compression-molded into a cylindrical shape. The filter 7 may be formed into a columnar shape having a mesh by winding a metal wire material around a rod-shaped core material and thus forming a plurality of layers, and crossing the wire materials with each other. The filter 7 may be one in which a sheet-like perforated plate such as an expanded metal, a punched metal, a metallic lath, a plain-woven wire mesh, or a tatami woven wire mesh is wound up in a columnar shape.

As described above, the filter 7 is a metal filter having a solid cooling portion formed in a columnar shape. The metal is stainless steel, iron, or the like, and may be plated or coated with copper, nickel, or the like. The term "solid" means that a metal material is contained at a predetermined density and thus combustion residues of combustion gas are filtered and the combustion gas is cooled. Therefore, it is possible to use a filter having the density formed substantially uniformly over the entire filter. However, as long as a difference occurs in the passage distance of the filter by the combustion gas and the temperature of the combustion gas can be adjusted, the inside need not be completely solid, and a gap may be included in any part of the filter, or a recess may be formed in the end surface of the filter.

The filter 7 protrudes from the diffuser portion 4 to the second combustion chamber 22. An annular gap 23 is formed between the filter 7 and the housing 2. Therefore, the combustion gas flows into the filter 7 not only from an end surface 71 of the filter 7 in the protruding direction into the second combustion chamber 22 but also from the gap 23 side (from a tapered portion 72 described later) formed between the filter 7 and the housing 2. By largely protruding the filter 7 toward the second combustion chamber 22 side, it is possible to increase the volume available as the cooling portion, and by widely dispersing the inflow place, it is possible to efficiently use, as the cooling portion, a wider region of the filter 7.

The filter 7 may be tapered in which the filter 7 is reduced in diameter in the protruding direction toward the second combustion chamber 22. In the example of FIG. 1, the cross-sectional area of the transverse cross section is reduced in diameter toward the end surface 71, which is the end part in the direction of the second combustion chamber 22, and the tapered portion 72 formed obliquely with respect to the axial direction is provided around the end surface 71. The tapered portion 72 angled with respect to the flow direction of the combustion gas facilitates the combustion gas to flow into the filter 7. On the other hand, the combustion gas flowing in from the side surface (in the example of FIG. 1, the tapered portion 72) facing the gap 23 is shorter in distance by which the combustion gas passes through the inside of the filter 7 than the combustion gas flowing in from the end surface 71, and there is a possibility that unevenness occurs in the degree of cooling or filtration depending on the inflow place. To balance them and ensure a sufficient inflow amount of the combustion gas from the end surface 71, it is preferable to configure the surface area of the filter 7 facing the gap 23 (the surface area of the tapered portion 72 in the example of FIG. 1) that is smaller than the surface area of the end surface 71 of the filter 7.

Figure 2:
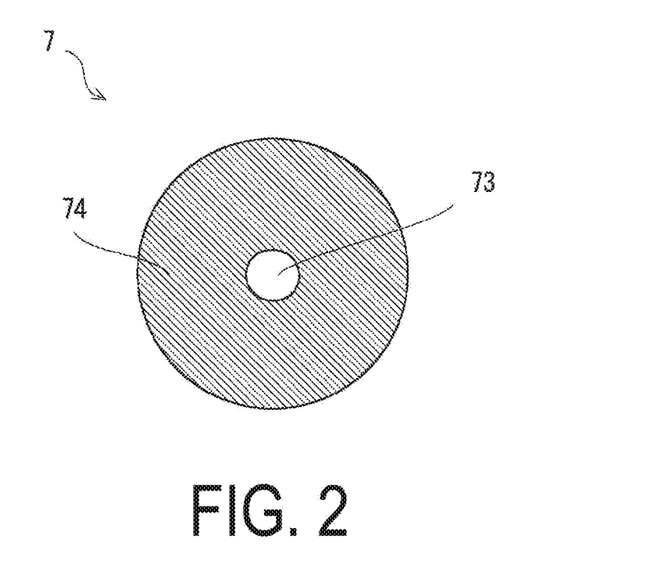
FIG. 2 is a view illustrating an example of a transverse cross section of a filter having a hole at the center.

The filter 7 may have a hole having a predetermined diameter or less penetrating from one end surface to the other end surface along the axial direction on a transverse cross section perpendicular to the axial direction, for example. FIG. 2 is a view illustrating an example of a transverse cross section of a filter having a hole at the center. In the example of FIG. 2, the filter 7 includes a through hole 73 along the axial direction, and a filter body 74 having an annular transverse cross section around the through hole 73. The through hole 73 is formed, for example, by removing the above-described core material after forming the filter 7. In this case, the filter body 74 functions as a solid cooling portion. For the filter 7 to filter the combustion gas and sufficiently function as a cooling portion, the cross-sectional area desirably satisfies the following expression.

(Cross-sectional area of filter body 74/(Cross-sectional area of filter body 74+Cross-sectional area of through hole 73))×100>50

It can be said that "50" on the right side represents, as a percentage, a reference value at which the proportion of the cross-sectional area of the filter body 74 to the sum of the cross-sectional areas of the filter body 74 and the through hole 73 should exceed. That is, it is desirable that the cross-sectional area of the filter body 74 be larger than the cross-sectional area of the through hole 73. When the side of the end surface of the filter on which the gas flows is tapered (e.g., a shape as illustrated in FIG. 1), the tapered portion also becomes a surface into which the gas enters, and thus the cross-sectional area of the filter body is a cross-sectional area of a part indicated by the maximum diameter of the filter body 74 in the surface into which the gas flows. The reference value is more preferably "60", and still more preferably "75". That is, the cross-sectional area of the filter body 74 is more preferably larger than 60% of the sum of the cross-sectional areas of the filter body 74 and the through hole 73, and still more preferably larger than 75%.

The second combustion chamber 22 is provided with an orifice plate 8 on the diffuser portion 4 side and in the vicinity of the filter 7. The orifice plate 8 is a disk-shaped member having at least one through hole 81. The through hole 81 is closed by a seal tape 82, and is opened when the internal pressure of the second combustion chamber 22 becomes a predetermined level or greater by the combustion gas. Such an orifice plate 8 is connected to the housing 2 by, for example, full circumference welding, and thus airtightness of the combustion chambers 21 and 22 before operation can be maintained. In the present example, the gas discharge port 43 is not closed. When the total opening area of the through holes 81 formed in the orifice plate 8 is smaller than the sum of the opening areas of the first gas discharge ports 431 and the second gas discharge ports 432, the combustion gas can be choked and the flow rate can be adjusted, which is preferable. In place of the orifice plate 8 and the seal tape 82, the gas generating agent may be held in an airtight manner by, for example, a canister formed of a metal film such as aluminum or other configurations.

Operation

In a state where the gas generator 1 is assembled to, for example, an airbag of an automobile, a connector (not illustrated) is connected to the pair of conductive pins 32 and 32, and power can be supplied to the ignition device 3. In this state, when a sensor (not illustrated) mounted on an automobile or the like detects an impact, the ignition device 3 is operated by an ignition current supplied to the pair of conductive pins 32 and 32. The ignition device 3 combusts the ignition charge in the cup body 31 and releases the combustion product to the outside of the cup body 31. The first gas generating agent 61 is ignited by flame or gas that is a combustion product of an ignition charge. The first gas generating agent 61 generates combustion gas as a combustion product, and the combustion gas passes through the through hole 54 of the partition wall 5 and ignites the second gas generating agent 62 of the second combustion chamber 22. The second gas generating agent 62 also generates combustion gas as a combustion product. When the seal tape 82 of the orifice plate 8 is ruptured by the pressure of the combustion gas of the second combustion chamber 22, the combustion gas passes through the through hole 81 and the filter 7, is filtered and cooled, and is discharged from the gas discharge port 43 of the diffuser portion 4.

Effects

When the internal pressure of the gas generator 1 is sufficiently high, the ratio between the amount of the combustion gas discharged from the first gas discharge port 431 per unit time and the amount of the combustion gas discharged from the second gas discharge port 432 per unit time corresponds to the ratio between the area of the first gas discharge port 431 and the area of the second gas discharge port 432. The temperature of the combustion gas discharged from the first gas discharge port 431 and the temperature of the combustion gas discharged from the second gas discharge port 432 are lowered according to the distance (i.e., the distance by which the combustion gas passes through the filter 7) from the second combustion chamber 22 to each gas discharge port. Therefore, the combustion gas discharged from the gas generator 1 has a temperature of a mixture of the combustion gas discharged from the first gas discharge port 431 and the combustion gas discharged from the second gas discharge port 432, and the temperature can be adjusted by the size of the first gas discharge port 431 and the size of the second gas discharge port 432.

Figure 3:
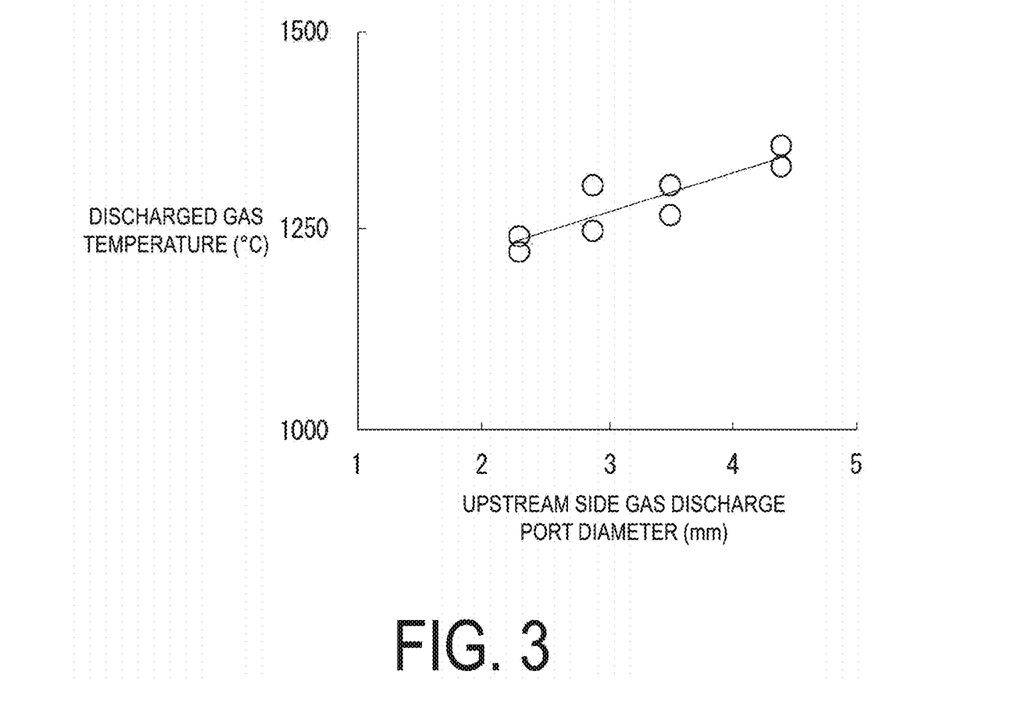
FIG. 3 is a view illustrating a simulation result of the relationship between the size of the gas discharge port and the temperature of combustion gas to be discharged.

FIG. 3 is a view illustrating a simulation result of the relationship between the size of the gas discharge port and the temperature of the combustion gas to be discharged. The horizontal axis in FIG. 3 indicates the diameter of the first gas discharge port 431, which is an upstream side. The diameter of the second gas discharge port 432, which is a downstream side, was changed according to the diameter of the first gas discharge port 431, and the total opening areas of the first gas discharge port 431 and the second gas discharge port 432 were made equal. The vertical axis in FIG. 3 indicates the temperature of the combustion gas to be discharged. The points plotted on the graph indicate the temperature when the temperature of the combustion gas discharged from the first gas discharge port 431 and the temperature of the combustion gas discharged from the second gas discharge port 432 are put together. As suggested by FIG. 3, the smaller the first gas discharge port 431 on the upstream side is (i.e., the larger the second gas discharge port 432 on the downstream side is), the lower the temperature of the combustion gas to be discharged is. A determination coefficient R 2 of the model expression indicated by a straight line in FIG. 3 was 0.7791. As described above, when the second gas discharge port 432 on the downstream side is increased, the amount of the combustion gas passing through the part of the filter 7 on the closed end 42 side of the diffuser portion 4 increases, and thus the proportion of the combustion gas passing through a relatively long distance in the filter increases. That is, the filter 7 can sufficiently function as a cooling portion. On the other hand, by increasing the first gas discharge port 431 on the upstream side, the proportion of the combustion gas passing through a relatively short distance in the filter increases. Therefore, it is also possible to increase the temperature of the combustion gas.

Second Embodiment

Figure 4:
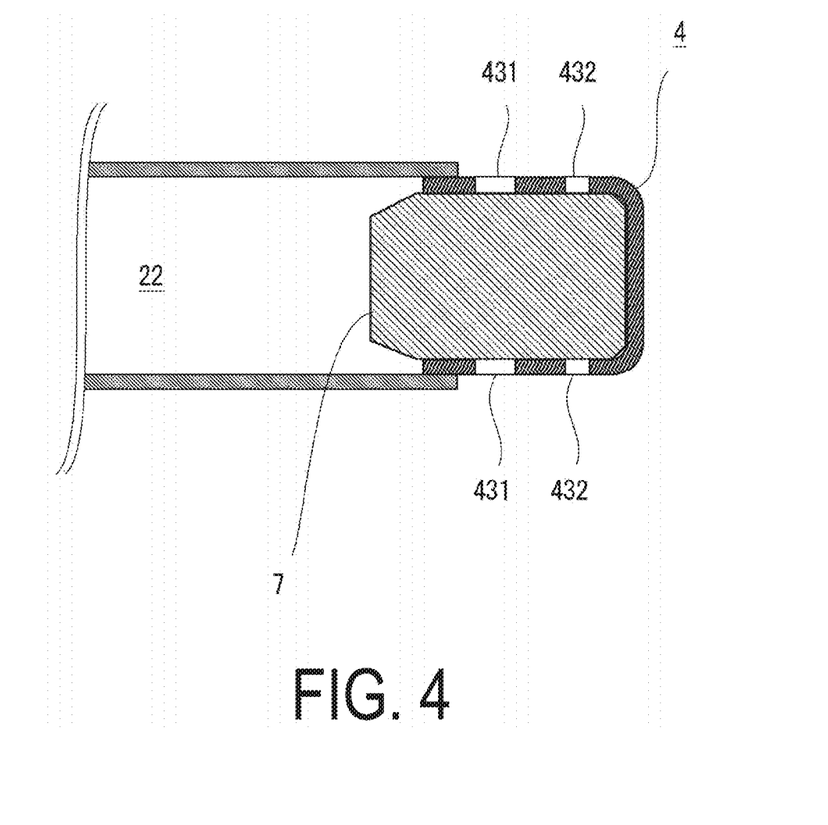
FIG. 4 is a partial schematic axial cross-sectional view illustrating an example of a gas generator according to a second embodiment.

FIG. 4 is a partial schematic axial cross-sectional view illustrating an example of a gas generator according to the second embodiment. In the present embodiment, the diffuser portion 4 is different from that of the example of FIG. 1. Then, the same components as those in the above-described first embodiment are denoted by corresponding reference signs or are not illustrated.

In the diffuser portion 4 of FIG. 4, the area of the first gas discharge port 431 close to the second combustion chamber 22 is larger than the area of the second gas discharge port 432 far from the second combustion chamber 22. With such a configuration, the proportion of the combustion gas passing through the filter 7 by a short distance increases, and the combustion gas having a high temperature is discharged. For example, when the gas generator 1 is assembled to an airbag, it is possible to promote early inflation of the airbag and improvement in output.

Third Embodiment

Figure 5:
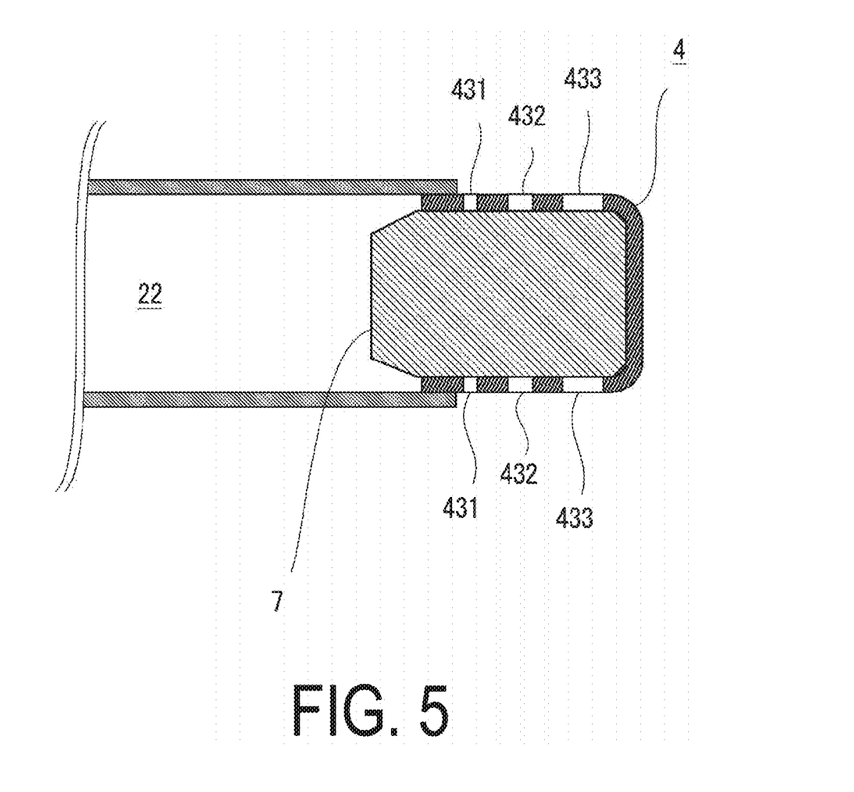
FIG. 5 is a partial schematic axial cross-sectional view illustrating an example of a gas generator according to a third embodiment.

FIG. 5 is a partial schematic axial cross-sectional view illustrating an example of a gas generator according to the third embodiment. Also in the present embodiment, only the diffuser portion 4 is different from that of the example of FIG. 1, and the same components as those in the above-described embodiments are denoted by corresponding reference signs or are not illustrated.

The diffuser portion 4 of FIG. 5 includes three gas discharge ports 431 to 433 (three gas discharge port groups) having different distances from the second combustion chamber 22. In the example of FIG. 5, the opening area sequentially increases from the upstream side to the downstream side in the flow direction of the combustion gas. Also in the present embodiment, the number of gas discharge ports included in each gas discharge port group is assumed to be equal. The opening area may be sequentially reduced from the upstream side to the downstream side in the flow direction of the combustion gas. As described above, the distance from the second combustion chamber 22 and the opening area may be differentiated in three or more stages. Even in such an example, when an arbitrary first gas discharge port close to the second combustion chamber 22 and an arbitrary second gas discharge port far from the second combustion chamber 22 have a predetermined magnitude relationship regarding the respective total opening areas, the temperature of the entire combustion gas discharged from the gas generator 1 can be adjusted. In the example of FIG. 5, the combination of the gas discharge port 431 and the gas discharge port 432, the combination of the gas discharge port 432 and the gas discharge port 433, and the combination of the gas discharge port 431 and the gas discharge port 433 correspond to the combination of the "first gas discharge port" and the "second gas discharge port" according to the present disclosure, and have a predetermined magnitude relationship regarding the total opening area.

Fourth Embodiment

Figure 6:
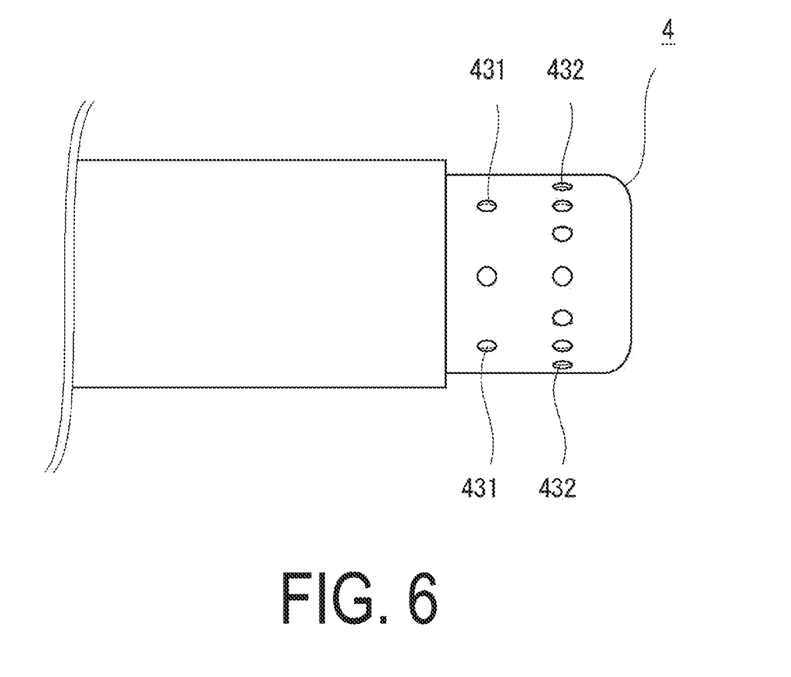
FIG. 6 is a partial side view illustrating an example of a gas generator according to a fourth embodiment.

FIG. 6 is a partial side view illustrating an example of a gas generator according to the fourth embodiment. Also in the present embodiment, only the diffuser portion 4 is different from that of the example of FIG. 1, and the same components as those in the above-described embodiments are denoted by corresponding reference signs or are not illustrated.

The diffuser portion 4 of FIG. 6 includes the two gas discharge ports 431 and 432 (gas discharge port group) having different distances from the second combustion chamber 22. However, the sizes of the individual gas discharge ports are the same, and the number of the first gas discharge ports 431 is less than the number of the second gas discharge ports 432. In other words, the number of the gas discharge ports belonging to the first gas discharge port group is less than the number of the gas discharge ports belonging to the second gas discharge port group. Also in the present embodiment, the total opening area of the first gas discharge ports 431 is smaller than the total opening area of the second gas discharge ports 432. The magnitude relationship of the total opening area may be reversed. Even in such an example, the temperature of the combustion gas to be discharged from the gas generator 1 can be adjusted.

Modification of Filter

Figure 7:
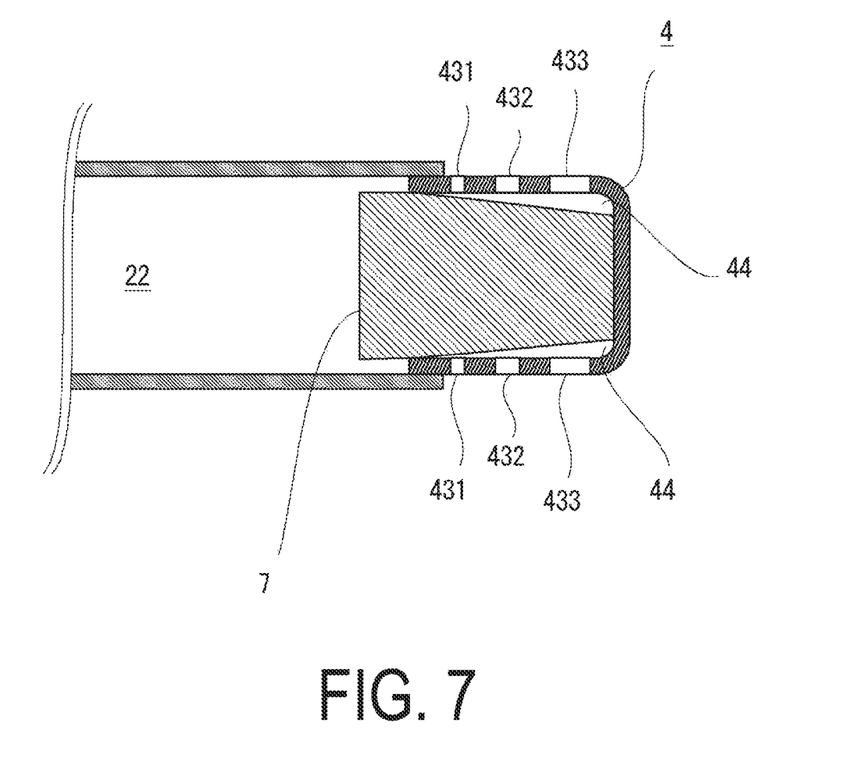
FIG. 7 is a partial schematic axial cross-sectional view illustrating a modification of the filter.

FIG. 7 is a partial schematic axial cross-sectional view illustrating a modification of the filter. Also in the present embodiment, the diffuser portion 4 and the filter 7 are different from those of the example of FIG. 1, and the same components as those in the above-described embodiments are denoted by corresponding reference signs or are not illustrated.

In the example of FIG. 7, the filter 7 is tapered on the side of the closed end 42, and the cross-sectional area of the transverse cross section decreases toward the closed end. That is, in the example of FIG. 7, an annular gap 44 is formed between the diffuser portion 4 and the filter 7. The side surface of the filter 7 is in contact with the inner periphery of the side wall 41 of the diffuser portion 4 at least on the open end side, and thus the combustion gas passes through the filter 7. The side surface of the filter 7 may be further tapered also on the side of the open end. The filter 7 of FIG. 7 is also accommodated in the accommodating space of the diffuser portion 4 and thus faces the gas discharge port 43. That is, the filter 7 extends from the open end to the closed end 42 of the diffuser portion 4, and the filter 7 has a surface facing each of the gas discharge ports 43. Therefore, also in the present embodiment, the combustion gas is cooled according to the distance by which the combustion gas has passed through the filter 7, and is discharged from the gas discharge port 43.

Figure 8:
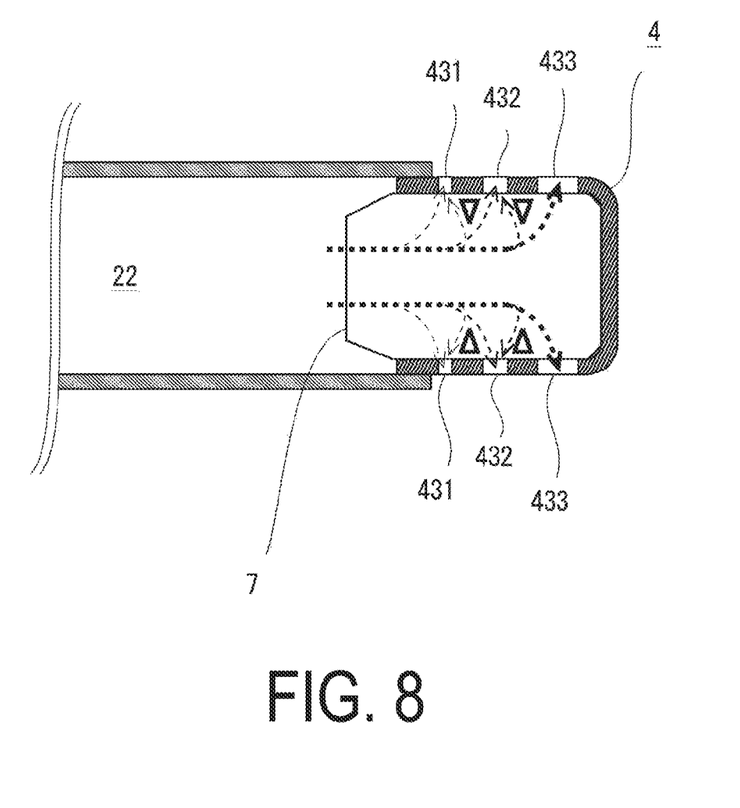
FIG. 8 is a view schematically illustrating a flow of combustion gas in a filter according to a comparative example.

FIG. 8 is a view schematically illustrating a flow of combustion gas in a filter according to a comparative example. The combustion gas introduced into the filter 7 tends to flow the shortest distance toward the gas discharge port 43. Therefore, when there is no space between the filter 7 and the diffuser portion 4 as in FIG. 8, the combustion gas hardly flows in a part of the filter 7 not facing the gas discharge port 43. In the example of FIG. 8, a place indicated by a triangle does not sufficiently exert a cooling function.

Figure 9:
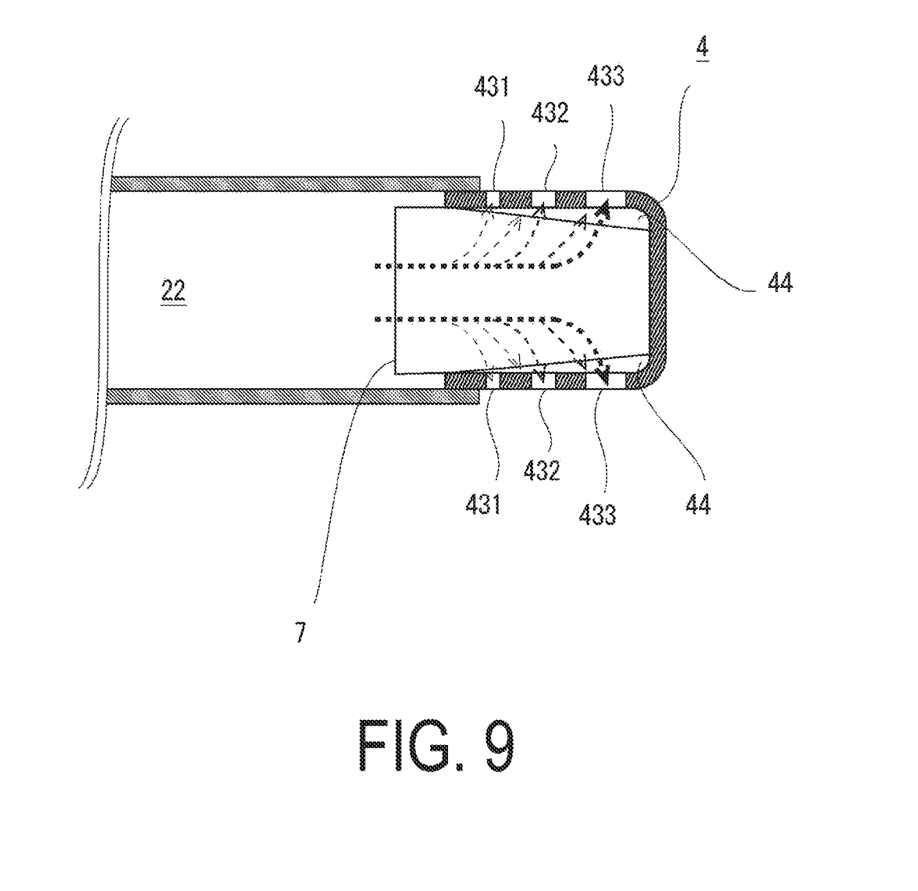
FIG. 9 is a view schematically illustrating a flow of combustion gas in the filter according to the above-described modification.

FIG. 9 is a view schematically illustrating a flow of combustion gas in the filter according to the above-described modification. When the annular gap 44 is formed, the combustion gas smoothly flows out of the annular gap 44 from the filter 7 as illustrated in FIG. 9. Therefore, although the volume and weight of the filter 7 are reduced as compared with those in the comparative example of FIG. 8, the region where the cooling function is not sufficiently exerted because the flow of the combustion gas hardly occurs is reduced.

For example, in a case where the filter 7 is formed of a wire material, when the combustion gas is discharged through the filter 7, fraying of the wire material occurs on the outer periphery of the filter 7, and fragments of the wire material may be released from the gas discharge port 43. In particular, as illustrated in FIG. 1 and the like, when most of the side surface of the filter 7 is in contact with the side wall 41 of the diffuser portion 4, the flow of the combustion gas is concentrated on a part of the side surface of the filter 7 facing the gas discharge port 43, and fraying of the wire material is likely to partially occur. On the other hand, when the annular gap 44 is formed between the diffuser portion 4 and the filter 7 as illustrated in FIG. 7, a part through which the combustion gas flows can be dispersed, and the occurrence of fraying can be reduced.

On the other hand, when the filter 7 is disposed without a gap between the filter 7 and the side wall 41 of the diffuser portion 4 as illustrated in FIG. 8, the volume of the filter 7 becomes larger, and the cooling effect of the combustion gas can be enhanced.

Others

While the gas generators according to some embodiments of the present disclosure have been described above, each aspect disclosed in the present description can be combined with other features disclosed in the present description. The gas generator 1 may be incorporated in a device other than an airbag.

While FIGS. 1, 4 to 7, and 9 illustrate examples in which the individual opening area of the gas discharge ports 43 monotonically increases or monotonically decreases from the upstream side to the downstream side in the flow direction of the combustion gas, or the number of the gas discharge ports 43 monotonically increases or monotonically decreases from the upstream side to the downstream side, the present invention is not limited to such examples. That is, the gas generator in which the gas flows in the axial direction of the filter is only required to have a configuration in which the cooling degree can be adjusted by making a difference between the amount of the gas flowing only on the upstream side of the filter and discharged and the amount of the gas flowing to the downstream side and discharged. For example, the opening ratio of the gas discharge port with respect to the surface area of the diffuser portion may be different between the upstream side and the downstream side in the flow direction of the combustion gas. Also in this case, it can be said that the total opening area of the first gas discharge ports provided on the upstream side is different from the total opening area of the second gas discharge ports provided on the downstream side. The shape of the gas discharge port 43 is not limited to a circle, and may be, for example, a hole that is long in the circumferential direction or a hole that is long in the axial direction of the housing 2 in the side wall 41 of the diffuser portion 4, or may be a shape other than a circle or an ellipse such as a square or a rectangle.

REFERENCE SIGNS LIST

1 Gas generator
2 Housing
21 First combustion chamber
22 Second combustion chamber
23 Gap
3 Ignition device
31 Cup body
32 Conductive pin
33 Igniter holding portion
34 Resin member
4 Diffuser portion
41 Side wall
42 Closed end
43 Gas discharge port
431 First gas discharge port
432 Second gas discharge port
44 Gap
5 Partition wall
51 Large diameter part
52 Small diameter part
53 Bottom part
54 Through hole
61 First gas generating agent
62 Second gas generating agent
7 Filter
71 End surface
72 Tapered portion
73 Through hole
8 Orifice plate
81 Through hole
82 Seal tape

The invention claimed is:

1. A gas generator comprising:
a housing forming an outer shell container;
an ignition device attached to one end side of the housing;
a combustion chamber formed inside the housing and configured to accommodate a gas generating agent;
a diffuser portion in a cup shape formed on the other end side in the housing, the diffuser portion including a closed end formed in one end part, an open end formed on an opposite side of the closed end, and a side wall positioned between the closed end and the open end, the diffuser portion being provided such that the open end thereof is disposed to face the combustion chamber and an accommodating space for internally accommodating a filter is formed therein;
a plurality of gas discharge ports formed in the diffuser portion and including a first gas discharge port relatively close in distance from the combustion chamber and a second gas discharge port relatively farther in distance from the combustion chamber than the first gas discharge port, and a total opening area of the first gas discharge port is different from a total opening area of the second gas discharge port; and
a filter including at least a part accommodated in the accommodating space and facing the plurality of gas discharge ports, the filter including a solid cooling portion that extends from the open end to the closed end in the diffuser portion, and that protrudes from the open end toward the combustion chamber and an annular gap is formed between a protruding portion of the solid cooling portion and the housing, allowing the combustion gas from the combustion chamber to flow into the solid cooling portion through an end face of the protruding portion facing the combustion chamber in a protruding direction and an side face of the protruding portion facing the annular gap, and cools a combustion gas of the gas generating agent.

2. The gas generator according to claim 1, wherein the first gas discharge port and the second gas discharge port are provided in the side wall of the diffuser portion, and
the filter is disposed without a gap between the filter and the side wall of the diffuser portion.

3. The gas generator according to claim 2, wherein
a total opening area of the second gas discharge port is larger than a total opening area of the first gas discharge port.

4. The gas generator according to claim 3, wherein
the first gas discharge portand the second gas discharge porteach have a same diameter, and the second gas discharge portare larger in number than the first gas discharge port.

5. The gas generator according to claim 2, wherein
the filter includes a through hole extending in direction from the open end toward the closed end in the diffuser portion.

6. The gas generator according to claim 5, wherein a cross-sectional area of the filter is larger than a cross-sectional area of the through hole.

7. The gas generator according to claim 1, wherein
the first gas discharge port and the second gas discharge portare provided in the side wall of the diffuser portion, and
the filter includes a taper that decreases in diameter from the open end toward the closed end in the diffuser portion, and an annular gap is provided between the filter and the side wall of the diffuser portion.

8. The gas generator according to claim 7, wherein a side surface of the filter is in contact with an inner periphery of the side wall of the diffuser portion at least on the open end thereof.

9. The gas generator according to claim 7, wherein
a total opening area of the second gas discharge port is larger than a total opening area of the first gas discharge port.

10. The gas generator according to claim 7, wherein
the filter includes a through hole extending in direction from the open end toward the closed end in the diffuser portion.

11. The gas generator according to claim 3, wherein
the first gas discharge port is same in number as the second gas discharge port, and an opening area of each of the second gas discharge port is larger than an opening area of each of the first gas discharge port.

12. The gas generator according to claim 1, wherein
the filter protrudes from the open end in the diffuser portion toward the combustion chamber formed inside the housing, and has an annular gap between the filter and the housing.

13. The gas generator according to claim 12, the filter is tapered in which the filter is reduced in diameter in a protruding direction toward the combustion chamber.

14. The gas generator according to claim 1, wherein
the filter is formed of a metal wire material or perforated plate.

15. The gas generator according to claim 1, comprising:
an orifice plate provided in the combustion chamber, the orifice plate having a disk-shaped structure having at least one through hole formed therein,
a total opening area of the at least one through hole is smaller than a sum of the opening areas of the first gas discharge port and the second gas discharge port.

16. The gas generator according to claim 15, wherein the at least one through hole is closed by a seal.

* * * * *